US012675097B2

(12) United States Patent
Peterson et al.

(10) Patent No.: US 12,675,097 B2
(45) Date of Patent: Jul. 7, 2026

(54) HIGH AVAILABILITY NETWORKING DEVICE

(71) Applicant: Fisher-Rosemount Systems Inc., Round Rock, TX (US)

(72) Inventors: Neil Peterson, Round Rock, TX (US); Gary Law, Round Rock, TX (US); Alexandra Griffith, Round Rock, TX (US); Scott J. Nicolet, Round Rock, TX (US); Sergio Diaz, Round Rock, TX (US); Mark Nixon, Round Rock, TX (US)

(73) Assignee: Fisher-Rosemount Systems Inc., Round Rock, TX (US)

( * ) Notice: Subject to any disclaimer, the term of this patent is extended or adjusted under 35 U.S.C. 154(b) by 647 days.

(21) Appl. No.: 18/165,750

(22) Filed: Feb. 7, 2023

(65) Prior Publication Data
US 2024/0264585 A1 Aug. 8, 2024

(51) Int. Cl.
*G05B 19/41* (2006.01)
*G05B 19/418* (2006.01)

(52) U.S. Cl.
CPC ... *G05B 19/41855* (2013.01); *G05B 19/4184* (2013.01)

(58) Field of Classification Search
CPC ......... G05B 19/41855; G05B 19/4184; G05B 2219/24175; G05B 2219/24182; G05B 2219/24192; G05B 19/0425
See application file for complete search history.

(56) References Cited

U.S. PATENT DOCUMENTS

| | | | |
|---|---|---|---|
| 9,973,447 B2 | 5/2018 | Liang et al. | |
| 2007/0076590 A1* | 4/2007 | Galpin | H04L 12/462 370/216 |
| 2008/0215910 A1* | 9/2008 | Gabriel | H04L 45/48 714/E11.071 |
| 2008/0239946 A1* | 10/2008 | Morita | H04L 43/0817 370/254 |
| 2013/0088952 A1* | 4/2013 | Balasubramanian | H04L 41/0654 370/217 |
| 2017/0026314 A1 | 1/2017 | Liang et al. | |
| 2018/0107609 A1* | 4/2018 | Kumar KN | G06F 8/61 |
| 2021/0100124 A1 | 4/2021 | Wrobel et al. | |

(Continued)

FOREIGN PATENT DOCUMENTS

GB 2567926 A 5/2019

OTHER PUBLICATIONS

Product Data Sheet, DeltaV PK Controller, 19 pages, Dec. 2022.

(Continued)

*Primary Examiner* — Christopher W Carter
(74) *Attorney, Agent, or Firm* — Quarles & Brady LLP

(57) ABSTRACT
A networking device and networking method for use in industrial automation applications. The networking device includes redundant circuitry that can allow the networking device to continue normal operation in the event of a failure that occurs with hardware of the networking device. The networking device includes both primary and secondary network switch circuits, and associated components. The networking device can be an advanced physical layer (APL) switch that interfaces with APL field devices.

20 Claims, 9 Drawing Sheets

(56) References Cited

U.S. PATENT DOCUMENTS

2022/0075352 A1    3/2022  Nixon et al.
2024/0056320 A1    2/2024  Swarr et al.

OTHER PUBLICATIONS

Product Data Sheet, DeltaV Electronic Marshalling with Distributed Charms, 20 pages, Jul. 2022.
Product Data Sheet, DeltaV Safety Instrumented System (SIS) with Electronic Marshalling, 52 pages, Sep. 2022.
Product Data Sheet, DeltaV SX Controller, 6 pages, Nov. 2022.
Wikipedia, "Highway Addressable Remote Transducer Protocol", 4 pages, printed May 1, 2023 from https://web.archive.org/web/20220630160019/https://en.wikipedia.org/wiki/Highway_Addressable_Remote_Transducer_Protocol.

* cited by examiner

HIGH AVAILABILITY NETWORKING DEVICE

BACKGROUND

Automation of complex processes involves integration of data from many different devices and systems. For example, systems that monitor, control, and provide safety functionality for industrial processes related to life sciences, chemical processing, midstream and refining, pulp and paper, metals and mining, and other types of complex industrial processes involve integration of data from different sensors, controllers, and other devices and systems used for process automation.

SUMMARY

A network device includes a primary network switch circuit, a secondary network switch circuit, a first communication port connectable to a first field device, a second communication port connectable to a second field device, a first output control circuit connected to the first communication port, a second output control circuit connected to the second communication port, and a controller connected to the primary network switch circuit, the secondary network switch circuit, the first output control circuit, and the second output control circuit. The controller includes circuitry configured to determine that a failure associated with a first connection between the first field device and the primary network switch circuit has occurred and operate the first output control circuit to establish a second connection between the first field device and the secondary network switch circuit.

A networking method includes establishing, via a communication port of a first networking device, a first connection between a field device and a primary network switch circuit of the networking device; receiving, via the communication port of the first networking device, data from the field device; routing, by the first networking device, the data received from the field device to a second networking device; determining, by a processor of the networking device, that a failure associated with the first connection between the field device and the primary network switch circuit of the networking device has occurred; and establishing, via the communication port of the networking device, a second connection between the field device and a secondary network switch circuit of the networking device.

A networking device includes a primary network switch circuit, a secondary network switch circuit, a communication port connectable to a field device, an output control circuit connected to the communication port, and a controller connected to the primary network switch circuit, the secondary network switch circuit, and the output control circuit. The controller includes circuitry configured to determine that a failure associated with a connection between the field device and the primary network switch circuit has occurred; and operate the output control circuit to establish a second connection between the field device and the secondary network switch circuit.

DETAILED DESCRIPTION

Given the critical nature of many industrial processes, the reliability of electronic equipment such as networking devices (e.g., routers, switches, etc.) is important for facilitating smooth process operation. Improvements in terms of efficiency and reliability of these devices are generally desired. A high availability networking device for use in an automation system can include redundant internal circuitry for more reliable and dynamic operation. The networking device can include both primary and secondary data paths for routing data received from field devices upstream within the system. In response to a failure that occurs (e.g., a hardware failure), the internal circuitry of the networking device can switch from the primary to the secondary data path to continue normal operation of the networking device without downtime for maintenance or replacement of parts or of the networking device itself. The networking device can also transmit an alert upstream in response to detecting a failure, thereby providing an indication that the networking device is operating in a degraded mode.

Figure 1:
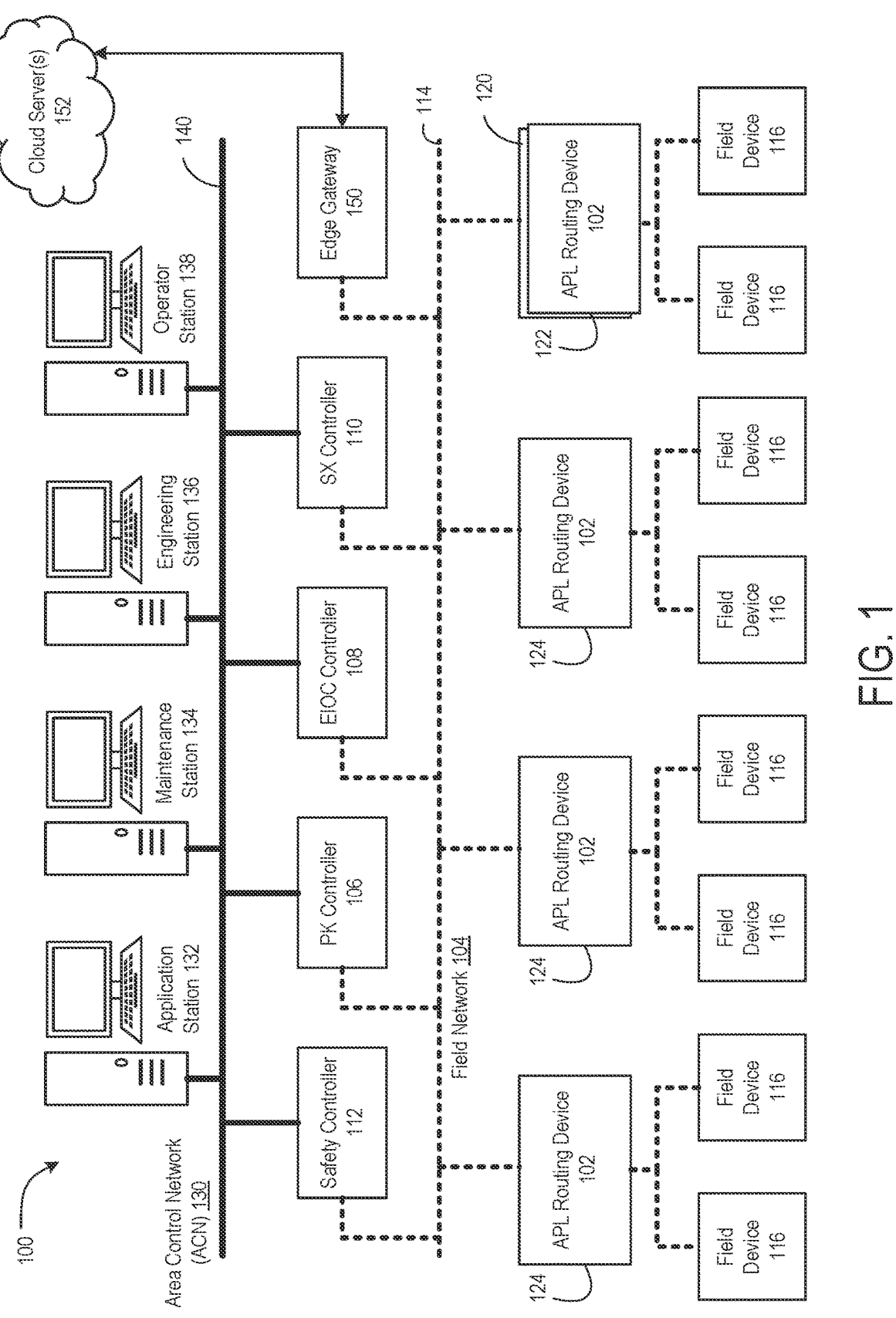
FIG. 1 is a block diagram illustrating example components of a system that can be used for process automation, in accordance with some aspects of this disclosure.

Referring to FIG. 1, an example system 100 that can be used for process automation is shown. System 100 includes one or more advanced physical layer (APL) routing devices 102, which can communicate within system 100 based on Ethernet-APL standards, for example. The system 100 includes a field network 104 including network controllers, such as DeltaV™ PK Controllers 106, an Ethernet I/O Card (EIOC) 108, a DeltaV™ SX Controller 110, a safety controller 112, or the like, one or more communication buses 114, one or more field devices 116, and one or more intermediary network devices, such as backplane 120, modular APL 122, APL switch 124, or the like. The network controllers (e.g., the network controllers 106, 108, 110, 112) are communicatively coupled to the one or more field devices 116 via the one or more communication buses 114 and the one or more intermediary network devices. The intermediary network device to which the field devices 116 are directly coupled (e.g., the modular APL 122 and the APL switch 124) may be referred to as input/output interfaces for the system 100. In some examples, the system 100 can include or be separated into various subsystems that can be combined or separately provided. For example, system 100 can include one or more of a DeltaV™ Distributed Control System (DCS), a DeltaV™ Safety Instrumented System (SIS), and a Manufacturing Execution System (MES), among other similar types of systems and/or subsystems. In some implementations, where one or more of these subsystems are provided separately (e.g., a separate SIS and a separate DCS system), separate communication busses can be used to implement the one or more communications busses 114. For example, a first communication bus can connect the APL routing devices 102 to the safety controller 112 for safety functionality, and a second communication bus can connect the APL routing devices 102 to the network controllers 106, 108, and 110 for control functionality, among other possible examples.

System 100 further includes an area control network (ACN) 130 that includes back-end computing devices providing monitoring, maintenance, engineering, and operational control functions for the devices of the field network 104. For example, the back-end computing devices may include one or more application stations 132, maintenance stations 134, engineering stations 136, and operator stations 138. Each back-end computing device may include one or more computing devices (e.g., laptop computers, desktop computers, tablet computers, mobile phones, etc.) that, for example, execute local software and/or access cloud-based services to provide the noted functionality. The back-end computing devices are coupled by an ACN bus 140 to the network controllers (e.g., network controllers 106, 108, 110, 112). In some examples, the back-end computing devices are used to program network controllers (e.g., to set parameters, operation schedules, or the like for field devices under control or supervision of the network controllers), retrieve information from the network controllers (e.g., data logs, program schedules, parameter settings, etc. for the field devices or network controllers), to control or schedule maintenance performed on or by the network controllers, or the like.

The field devices 116 may take a variety of forms and perform a variety of functions. For example, field devices 116 may include various types of sensors, transmitters, thermocouples, and switches that provide an indication of various process parameters; solenoids and digital valve controllers (DVCs) that control the operation of valves; lights or other indicators that provide a field indication of process conditions; and other types of process input devices and output devices. The field devices 116 may each be classified as an output field device, an input field device, or an indicator field device. Output field devices are field devices operable to control an output of a system process of the system 100. For example, output field devices may include motors, valves, solenoids, or other actuatable elements configured to stop, start, or adjust the flow of a material, fluid, or gas; adjust the position of a movable component (e.g., open or close a door, rotate a gear or drive shaft, etc.); control a heating or cooling element; enable or disable power to a component; or the like. Input field devices are field devices that obtain a process parameter to the system 100 (e.g., via a sensor) and provide an indication of the process parameter to the system 100 (e.g., for use to determine how to control an output field device). An indicator field device is a field device configured to provide an indication of a process condition of the system 100 in the field (e.g., via a light, speaker, or other controllable indicator of the indicator field device). Some field devices 116 may perform more than one of controlling a process output, providing a process input, and providing an indication of a process condition of the system 100. In such cases, the field devices may be considered to be, for example, an output field device, an input field device, and an indicator field device. Additionally, a non-output field device may be a field device that is not classified as an output field device, such as a field device that is classified as an input field device and/or an indicator field device and that does not directly control a process output.

As noted above, the system 100 includes one or more APL routing devices 102, also referred to as APL routers or APL switches. Generally, an APL routing device 102 is configured to route messages between field devices 116 coupled to the APL routing device 102 and upstream devices, such as the safety controller safety controller 112 and/or another of the network controllers. This routing may include one or more of receiving a message, identifying an intended recipient of the message, translating the message to a communication protocol used by and suitable for the recipient, and transmitting the translated message. Further, the APL routing devices 102 are configured to communicate using a two-wire digital protocol that uses a two-wire link between devices that conveys both power and communication signals, such as Ethernet Advanced Physical Layer (referred to herein as Ethernet-APL or APL). Ethernet-APL is a physical layer for Ethernet-based communications that enables communications at high speeds and over long distances. Ethernet-APL uses a two-wire link between communicating devices that conveys a supply of power (to one or more of the communicating devices) and communication signals. The two-wire link includes a single, twisted-pair (2-wire) cable that may extend through an outer shielding. Ethernet-APL is a subset of the Ethernet standard particularly designed for providing communications in industrial settings to and from field devices that may be distributed across great distances, may rely on high-speed communications, and may be located in hazardous areas. Although multiple devices are described as APL devices herein, and such devices may use Ethernet-APL for communications, in some examples, these devices may implement another two-wire digital protocol that includes power and communication transmission. Accordingly, the APL routing device 102 may also be referred to as a two-wire routing device or a two-wire power and digital communication routing device, which may be configured to communicate and provide power according to Ethernet-APL and/or another two-wire digital protocol that includes power and communication transmission.

Two types of such APL routing devices 102 are illustrated in FIG. 1, the modular APL switch 122 and the APL switch 124. The modular APL switch 122 is received in a module bay of the backplane 120. As described in further detail below (e.g., with respect to FIG. 5), the backplane 120 may include a plurality of module bays, each configured to receive a respective field device characterization module (CHARM), such as the modular APL switch 122. The backplane 120 may further include a housing or chassis supporting the module bays, a microcontroller to route messages between upstream devices and the field device characterization modules, an interconnecting communication bus (or busses) to interconnect the microcontroller and field device characterization modules, and a power supply to power the microcontroller and field device characterization modules.

The APL switch 124 may be a stand-alone unit, physically and functionally, for example, with a housing that includes or couples to an independent power supply and does not mount to a backplane configured to receive a plurality of modular APL switches or other routing devices. In other examples, the APL switch 124 is a stand-alone unit, functionally, but is mounted within a chassis along with other routing devices and hardware. In some examples, an APL switch 124 is configured to interface with more than one field device 116, while a modular APL switch 122 is configured to interface with a single field device 116. In other examples, an APL switch 124 is configured to interface with a single field device 116, and/or a modular APL switch 122 is configured to interface with more than one field device 116.

The system 100 can further includes an edge gateway 150 and one or more cloud servers 152. The edge gateway 150 can be used to go around other control devices (e.g., devices on the area control network 130 and/or the field network 104) to access different devices in system 100, such as the field devices 116. The edge gateway 150 can connect to the field devices 116 via the communication bus 114 and the field network 104, for example. By communicating with the edge gateway 150 (e.g., via an Internet connection, a cellular connection, or other types of wireless connections), cloud applications running on the one or more cloud servers 152 and/or other remote applications can access the field devices 116. For example, cloud applications can access data generated by the field devices 116 indicative of different variables associated with an industrial process (e.g., temperature data, pressure data, etc.) and/or provide control commands to the field devices 116, among other possible interactions.

The safety controller 112, which may also be referred to as a logic solver, may be a controller of a safety instrumented system of the system 100. Accordingly, the safety controller 112 may receive and analyze system data (e.g., from field devices 116, from intermediary network devices (e.g., the modular APL switch 122 or the APL switches 124), and from other network controllers) and determine whether a safety condition is present. The safety controller 112, like the other network controllers, may include a memory storing software and an electronic processor configured to retrieve and execute the software to implement the functionality of the safety controller 112 described herein. The memory can include read-only memory (ROM), random access memory (RAM), other non-transitory computer-readable media, or a combination thereof. The electronic processor can include one or more processors, field programmable gate arrays (FPGAs), application specific integrated circuits (ASICs), or other processing circuitry operating alone or in combination with one another to implement the functionality of the safety controller 112 described herein. In some examples, the safety controller 112 includes redundant components (e.g., a redundant electronic processor and memory that mirrors the (primary) electronic processor and memory already described) to provide backup functionality in the event of an error or failure of the primary components.

The other network controllers, such as the network controller 106, may implement a system process for the system 100. For example, the network controllers may have a process control logic defined in a memory of the network controller that is executed by the electronic processor of the network controller. Through execution of the process control logic, the network controller 106 may receive system data (e.g., from field devices 116) indicating system parameters of the system 100, process the system data (e.g., according to settings, thresholds, and the like defined in the memory), and generate and transmit operation controls to the field devices 116 to control the field devices 116 to thereby implement the system process.

Figure 2:
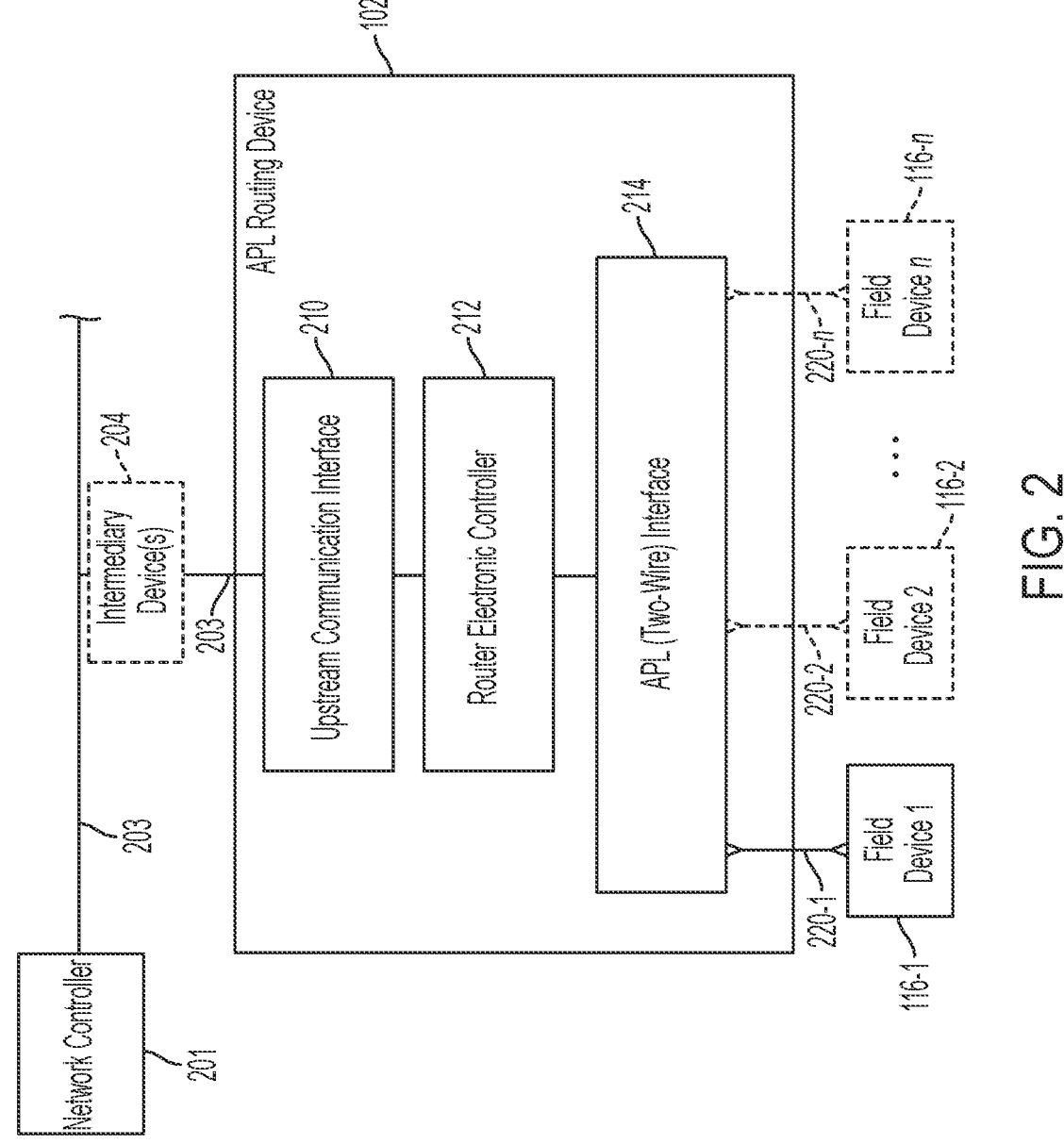
FIG. 2 is a block diagram illustrating example components of a routing device that can be used with the system of FIG. 1, in accordance with some aspects of this disclosure.

Referring to FIG. 2, a block diagram illustrating example components of an APL routing device 102 is shown. The APL routing device 102 of FIG. 2 is a block diagram applicable to individual examples of both the APL switch 124 and the modular APL switch 122 of FIG. 1. As shown in FIG. 2, the APL routing device 102 may be coupled upstream to the safety controller 112 via communication bus 114. In some examples, one or more intermediary devices 204 are provided between (logically and/or physically) the APL routing device 102 and the safety controller 112 along communication bus 114. The intermediary devices 204 may include, for example, one or more microcontrollers of a backplane (e.g., of the backplane 120), gateway devices, additional routing devices, and the like. Like shown in FIG. 1, in FIG. 2, the APL routing device 102 is further coupled to one or more (n) field devices 116 (where n≥1), individually labeled as field devices 116-1, 116-2, through 116-$n$.

The APL routing device 102 includes an upstream communication interface 210, a router electronic controller 212, and an APL (two-wire) interface 214. The upstream communication interface 210 includes the physical circuitry (e.g., ports, antennas, filters, drivers, transceivers, and the like) that couples the APL routing device 102 to the communication bus 114. The upstream communication interface 210 enables the router electronic controller 212 to couple to the communication bus 114 and communicate with upstream devices. Accordingly, the upstream communication interface 210 communicatively couples the router electronic controller 212 (and, thereby, the APL routing device 102) to the safety controller 112 and other upstream devices in the system 100.

The APL interface 214 includes the physical circuitry (e.g., ports, antennas, filters, drivers, transceivers, and the like) that couples the APL routing device 102 to two-wire links 220-1 to 220-$n$ for communication with the field devices 116. The APL interface 214 enables the router electronic controller 212 to couple to the one or more field devices 116 via the respective two-wire links 220-1 to 220-$n$. Accordingly, the APL interface 214 communicatively couples the router electronic controller 212 (and, thereby, the APL routing device 102) to the one or more field devices 116. An example of the APL interface 214 is described further below with respect to FIG. 4.

The router electronic controller 212, via the interfaces 210 and 214, is configured to route messages between the one or more field devices 116 coupled to the APL routing device 102 and upstream devices, such as the safety controller 112 and/or another of the network controllers. This routing may include one or more of receiving a message, identifying an intended recipient of the message, translating the message to a communication protocol used by and suitable for the recipient, and transmitting the translated message.

Figure 3:
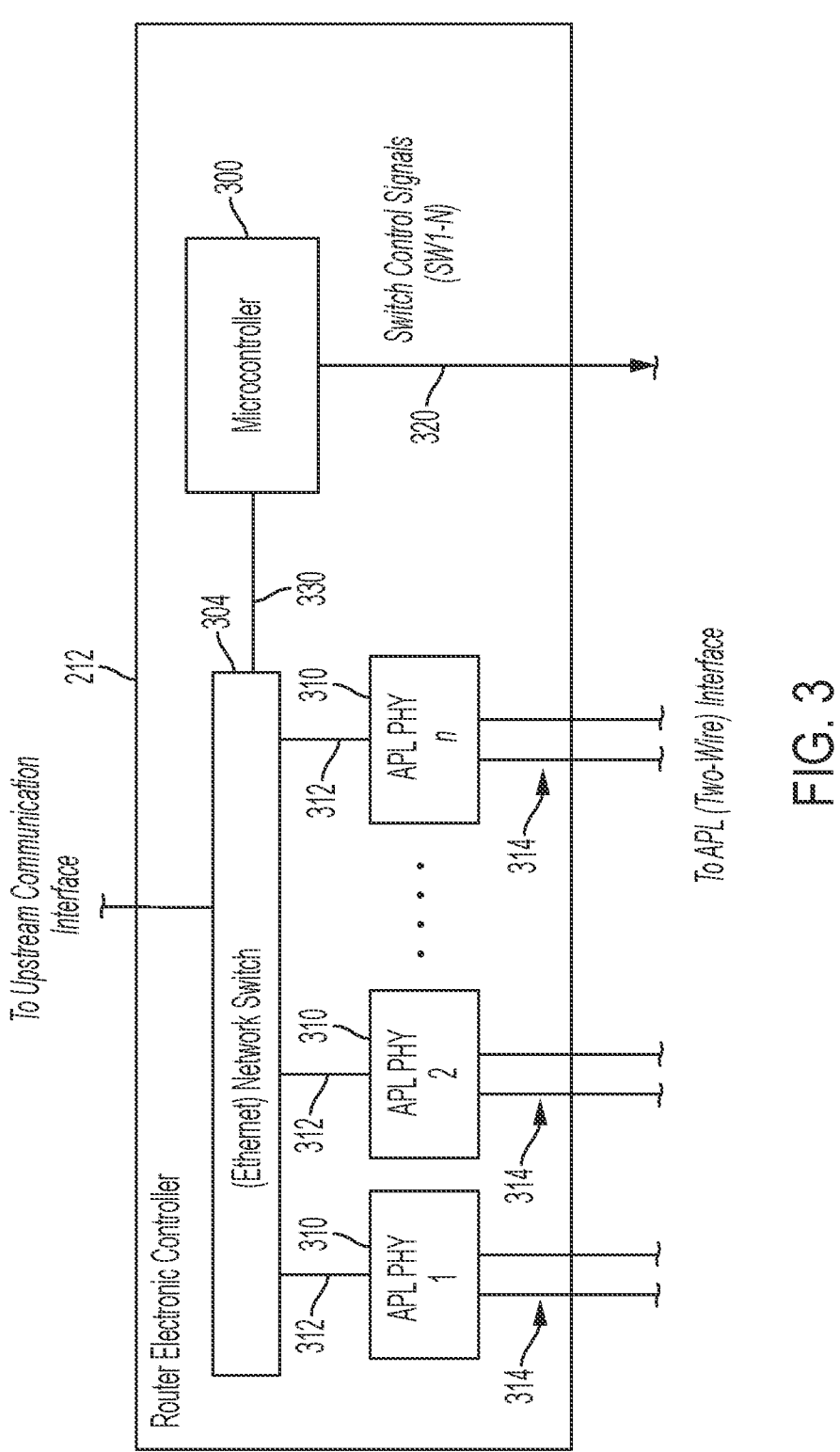
FIG. 3 is a block diagram illustrating example components of a controller of the routing device of FIG. 2, in accordance with some aspects of this disclosure.

Referring to FIG. 3, a block diagram illustrating example components of the router electronic controller 212 is shown. As illustrated, the router electronic controller 212 includes a microcontroller 300, a network switch 304, and one or more (n) APL physical interfaces 310 (also referred to as two-wire physical interfaces 310). Each of the n APL physical interface 310 may be associated with a respective one of the n field devices 116 and, more particularly, coupled to a respective one of the n field devices 116 via APL interface 214 and a respective one of the n two-wire links 220.

In some examples, the microcontroller 300 includes an electronic processor and a memory storing instructions retrieved and executed by the electronic processor to perform the functions of the microcontroller 300 described herein. The memory can include read-only memory (ROM), random access memory (RAM), other non-transitory computer-readable media, or a combination thereof. The electronic processor can include one or more processors, field programmable gate arrays (FPGAs), application specific integrated circuits (ASICs), or other processing circuitry operating alone or in combination with one another to implement the functionality of the microcontroller 300 described herein. The microcontroller 300 is configured to communicate with one or more of the network controllers of the system 100, including the safety controller 112. More specifically, the microcontroller 300 may be associated with a unique address such that the safety controller 112 may send message to the microcontroller 300 (and, thus, to the router electronic controller 212 and APL routing device 102) and receive messages therefrom.

The microcontroller 300 may also be configured to generate switch control signals 320 for controlling power switches associated with the two-wire links 220 of the field devices 116. As illustrated, the switch control signals 320 are provided to the APL interface 214, which is illustrated in further detail with respect to FIG. 4. The switch control signals 320 may include one control signal for each power switch. The switch control signals 320 may be provided over one or more control wires (e.g., one per power switch) that connect the microcontroller 300 to each respective power switch.

The network switch 304 is configured to route messages between upstream and downstream devices in the system 100, and between the router electronic controller 212 and upstream and downstream devices in the system 100. For example, the network switch 304 may be an Ethernet network switch configured to receive communications via the upstream communication interface 210 sent according to an Ethernet communication protocol (e.g., as defined by a standard under the Institute of Electrical Electronics Engineers (IEEE) 802, such as IEEE 802.3 or 802.11) from an upstream device, such as the safety controller 112, the controller 106, the controller 108, or the controller 110. The network switch 304 may parse each communication, which may include a series of data packets including a header and payload data packets, to identify an intended recipient from an address or identifier in the header. The network switch 304 may then route the communication to the intended recipient (e.g., to one of the field devices 116 or to the microcontroller 300 representing the APL routing device 102). To route a communication to the microcontroller 300, the network switch 304 may transmit the communication over bus 330 to the microcontroller 300. The network switch 304 may transmit the communication over bus 330 in the same format as the format in which the communication was received. The microcontroller 300 may then parse the communication, recognize that the communication is intended for the microcontroller 300 based on the address or identifier in the header, and then process the payload. To route a communication to one of the field devices 116, then microcontroller 300 may transmit, over a bus 312, the communication to the APL physical interface 310 associated with (and coupled to) the field device 116 that is the intended recipient of the message. The APL physical interface 310 may then translate the packetized communication from the Ethernet protocol to the digital two-wire protocol (e.g., APL protocol) and transmit the communication over a two-wire connector 314 to the APL interface 214. For ease of description, the two-wire connector 314 will be referred to as the internal connector 314, although this naming should not be construed as requiring that the two-wire connector 314 be entirely internal unless otherwise stated. As described further with respect to FIG. 4, the APL interface 214 couples the internal connector 314 to one of the two-wire links 220 and, ultimately, to one of the field devices 116, which is intended to receive the communication.

The network switch 304 is further configured to receive communications from the microcontroller 300 and the field devices 116 and to route the communications appropriately, e.g., to the safety controller 112 or other upstream devices. For example, the network switch 304 may parse each communication, which may include a series of data packets including a header and payload data packets, to identify an intended recipient from an address or identifier in the header. The network switch 304 may then route the communication to the intended recipient (e.g., to one of the safety controller 112, controller 106, controller 108, controller 110, etc.). To route a communication from the microcontroller 300, the network switch 304 may receive the communication over bus 330 from the microcontroller 300. The network switch 304 may transmit the communication via upstream communication interface 210 over bus 114 in the same format as the format in which the communication was received. A communication from one of the field devices 116 may first be received by the APL physical interface 310 associated with (and coupled to) the field device 116 that is transmitting the message. The APL physical interface 310 may then translate the communication from the digital two-wire protocol (e.g., APL protocol) to the Ethernet protocol and provide the communication over bus 312 to the network switch 304. At least in some examples, the translations of communications to and from the digital two-wire protocol (e.g., to/from the APL protocol) may use standard network translation techniques. The network switch 304 may then route the communication to the intended recipient (e.g., to one of the safety controller 112, controller 106, controller 108, controller 110, etc.).

In some examples, the APL routing device 102 is coupled to an upstream device or devices via another two-wire link and is configured to communicate using the APL protocol upstream (i.e., in addition to communicating using the APL protocol downstream). In such examples, an additional APL physical interface 310 may be provided between the network switch 304 and the upstream communication interface 210 to translate communications to and from the APL protocol.

Although the microcontroller 300, network switch 304, and APL physical interfaces 310 are illustrated as separate components, in some examples, one or more of these components are integrated into a single device. For example, a shared electronic processor and memory may serve as (i.e., perform the functions of) the electronic processor and memory of both the network switch 304 and the microcontroller 300, of both the network switch 304 and APL physical interfaces 310, or of the network switch 304, the microcontroller 300, and the APL physical interfaces 310.

Figure 4:
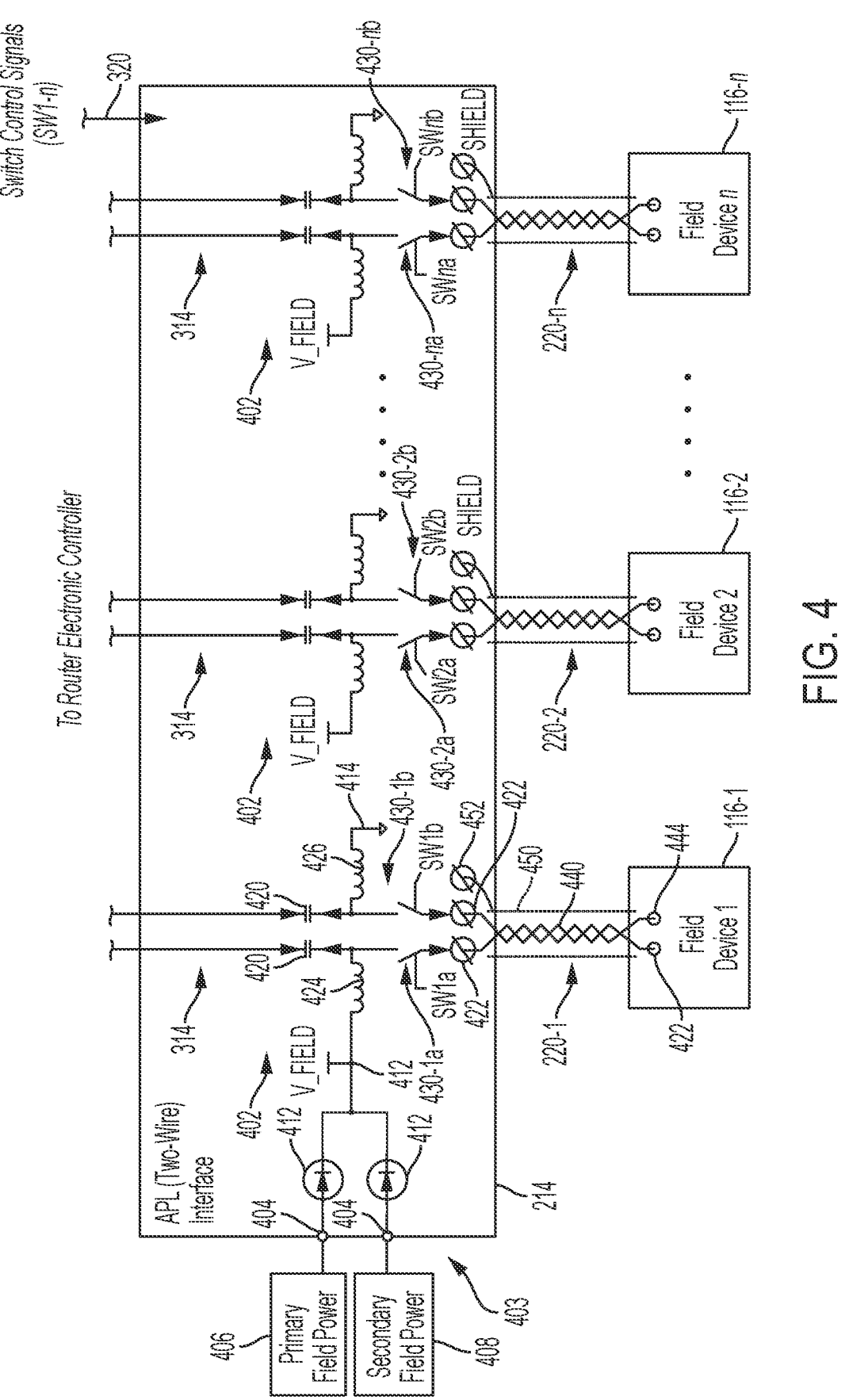
FIG. 4 is a block diagram illustrating example components of a communication interface of the routing device of FIG. 2, in accordance with some aspects of this disclosure.

Referring to FIG. 4, a block diagram illustrating example components of the APL interface 214 is shown. As illustrated, the APL interface 214 includes the other ends of the internal connectors 314 from the router electronic controller 212, and receives the switch control signals 320 from the router electronic controller 212 along switch control lines. The APL interface 214 includes one or more (n) sub-APL (two-wire) interfaces 402 (herein, sub-interfaces 402), each providing a separate connection or interface point for a respective field device of the field devices 116. Although the APL interface 214 is illustrated with (n) sub-interfaces 402 coupled to n two-wire links 220 and n field devices 116, in some examples, the APL interface 214 has more sub-interfaces 402 than field devices 116 (e.g., m sub-interfaces 402, where m>n), meaning that some (i.e., m−n) of the sub-interfaces 402 are open or unused and available to couple to further field devices 116. In other words, even if an APL interface 214 is operable to independently couple to 10 fields devices (e.g., has 10 sub-interfaces 402), the APL interface 214 may be coupled to only 1, 2, 5, or another number of field devices that is less than the total capacity of the APL interface 214. For ease of discussion, however, the description will generally refer to a system having n sub-interfaces 402, two-wire links 220, and field devices 116.

The APL interface 214 further includes a power supply 403 including connections 404 for coupling to a primary field power 406 and a secondary field power 408. The secondary field power 408 may be a redundant power source providing a backup supply of power in the event of an interruption to the primary field power 406. Both the primary and secondary field powers 406, 408 may provide a DC supply of power to the APL routing device 102 via the connections 404. Each connection 404 is coupled to a power supply node 410 via a respective diode 412. Each diode 412 prevents a reverse flow of power (e.g., from the primary field power 406 to the secondary field power 408, and vice versa).

Each sub-interface 402 is coupled to the power supply node 410, ground 414, the internal connectors 314, and one of the two-wire links 220 (e.g., two-wire link 220-1). For example, with reference to the sub-interface 402 for the field device 116-1, the internal connectors 314 are connected to respective capacitors 420, which are connected to respective ports 422, which are conceited to the two-wire link 220-1. Additionally, the power supply node 410 is coupled via an inductor 424 to a node between a first of the capacitors 420 and a first of the ports 422, and the ground 414 is coupled via an inductor 426 to a node between the second of the capacitors 420 and the second of the ports 422. Each sub-interface 402 further includes a pair of power switches 430, one for each leg of the associated two-wire link 220. For example, a first power switch 430-1a is coupled downstream of the node connecting to the inductor 424, and a second power switch 430-1b is coupled downstream of the node connecting to the inductor 426. The power switches 430 may be generically referred to as the power switches 430, and individually referred to as 430-1a, 430-1b, 430-2a, 430-2b, . . . through 430-na, 430-nb. Each power switch 430 may be, for example, a transistor (e.g., a field effect transistor (FET), a metal-oxide-semiconductor field effect transistor (MOSFET), bipolar transistor (BJT), a relay, or the like). The description of the sub-interface 402 associated with two-wire link 220-1 similarly applies to the other sub-interfaces 402.

In some examples, the switch control signals 320 (also labeled SW1-n) may include a plurality of control signals, one for each power switch 430. Each control signal may be provided (e.g., along a conductive path) to a control gate of the associated power switch 430. For example, as illustrated, the switch control signals 320 may include a first switch control signal SW1a (to control the power switch 430-1a), a second switch control signal SW1b (to control the power switch 430-1b), a third switch control signal SW2a (to control the power switch 430-2a), a fourth switch control signal SW2b (to control the power switch 430-2b), and so on through control signals SWna and SWnb. In some examples, the switch control signals 320 includes shared control signals that are provided to more than one power switch 430. For example, a single shared control signal may be provided to the control gate of each of the power switches 430 to provide control thereof in parallel, such that the microcontroller 300 (of FIG. 3) can generate a single all-on or all-off control signal to selectively enable all power switches 430 and disable all power switches 430 in parallel. In other embodiments, one or more shared control signals of the switch control signals 320 may be provided to a subset of the power switches (i.e., fewer than all of the power switches 430). Regardless, each power switch 430 may receive a control signal from the switch control signals 320, whether shared among one or more other power switches 430 or unique to that particular power switch 430.

FIG. 4 also illustrates the two-wire links 220 in further detail. For example, as illustrated, the two-wire link 220-1 includes a twisted pair of wires 440, with a first wire of the twisted pair coupled to the first port 422 and to a first port 442 of the field device 116-1 and a second wire of the twisted pair coupled to the second port 422 and to a second port 444 of the field device 116-1. Additionally, the twisted pair of wires 440 extends through a shielding 450. The shielding 450 may be a conduit defining a tubular volume within which the twisted pair of wires 440 resides. The shielding 450 may include a conductive layer and may be coupled to a port 452 of the APL interface 214, which may be grounded. The shielding 450 may protect the twisted pair of wires 440 from interference that may disrupt communications along the two-wire link 220. The description of the two-wire link 220-1 similarly applies to the other two-wire links 220 (e.g., two-wire link 220-2 through 220-n).

Although the power switches 430 are illustrated as being within the APL interface 214 in FIG. 4, in some other examples, the power switches 430 are external to the APL routing device 102. For example, the power switches 430 may be positioned at another location along the respective two-wire links 220 that is external to a housing of the APL routing device 102 and between the APL routing device 102 and the associated field device 116. The control signals of the switch control signals 320 that are configured to the control each respective power switch 430 may be provided along a cable or other communicative connection to the particular power switch 430. For example, as described below with respect to FIG. 6, the power switches 430 may be external to the APL routing device 102 and part of a backplane that retains the APL routing device 102. In other examples, the power switches 430 may be further downstream along the two-wire link 220 and, accordingly, not part of the backplane. In some examples, some of the power switches 430 are internal to the APL routing device 102 and some of the power switches 430 are external to the APL routing device 102.

Figure 5:
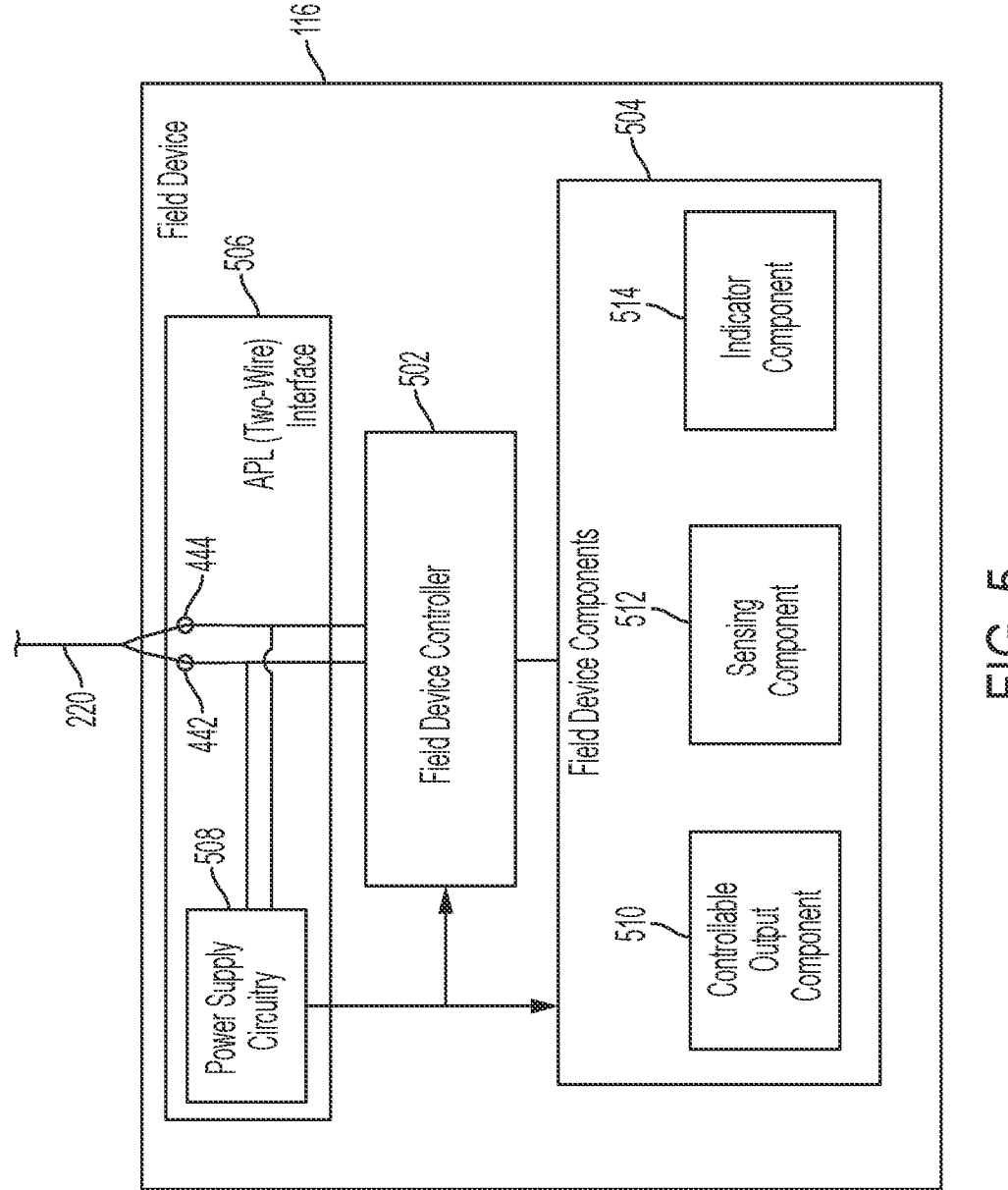
FIG. 5 is a block diagram illustrating example components of a field device that can be used in the system of FIG. 1, in accordance with some aspects of this disclosure.

Referring to FIG. 5, a block diagram illustrating example components of one of the field devices 116 is shown. As described above, each field device 116 is configured to receive power and communications from the APL routing device 102 over a respective one of the two-wire links 220. Each field device 116 may include a field device controller 502, one or more field device components 504, and a field device APL interface 506. The field device APL interface 506 may include the ports 442 and 446, power supply circuitry 508, and connections from the ports 442 and 446 to the field device controller 502 and to the power supply circuitry 508. The field device components 504 may include one or more controllable output components 510 (e.g., a solenoid, a hydraulic pump-drive valve, a motor drive valve, etc.), one or more sensing components 512 (e.g., a pressure sensor, temperature sensor, flow rate sensor, current sensor, voltage sensor, etc., and/or one or more indicating components 514 (e.g., a speaker, light, LED display, etc.). The power supply circuitry 508 may receive, condition, and supply power received via the two-wire link 220 to the other components of the field device 116, such as the field device controller 502 and the one or more field device components 504.

The field device controller 502 may include an electronic processor and a memory. The memory may store instructions that the electronic processor retrieves and executes to implement the functionality of the field device controller 502 described herein. The electronic processor can include one or more processors, field programmable gate arrays (FPGAs), application specific integrated circuits (ASICs), or other processing circuitry operating alone or in combination with one another to implement the functionality of the field device controller 502 described herein. For example, the field device controller 502 may receive and process communications transmitted over the two-wire link 220 (e.g., originating from the APL routing device 102, safety controller 112, or another controller of the system 100). To process the communications, the field device controller 502 may recognize that the communication is intended for the field device based on a field device identifier in the communication (e.g., an address in a header of the communication associated with the field device). In response to determining that the communication is intended for the field device 116, the field device controller 502 may interpret and carry out commands or respond to requests indicated in the payload of the communication. For example, the command may request information from a sensor of the sensing components 512, in which case the field device controller 502 may respond to the requesting device with the requested sensor information; the command may request that the field device control a controllable output component 510 (e.g., a valve) to open or close a particular amount or to a particular setpoint, in which case the field device controller 502 may react by controlling the controllable element as commanded; the command may request that the field device control an indicator component 514 (e.g., a light) to illuminate, in which case the field device controller 502 may react by controlling the indicator component 514 to illuminate as commanded; among many other potential commands.

Additionally, the field device controller 502 may generate communications and transmit the communications over the two-wire link 220 (e.g., via the field device APL interface 506 and in accordance with the APL protocol). The field device controller 502 may generate and transmit these communications in response to a request (e.g., a request for sensor information), based on programming of the field device controller 502 to periodically transmit sensor information or status information of the field device, or based on programming of the field device controller 502 defining conditions or triggers to cause the field device controller to generate and transmit the communications. For sending and receiving communications over the two-wire link 220, the field device controller 502 may include or implement a physical layer interface similar to the APL physical layer interface 310.

Figure 6:
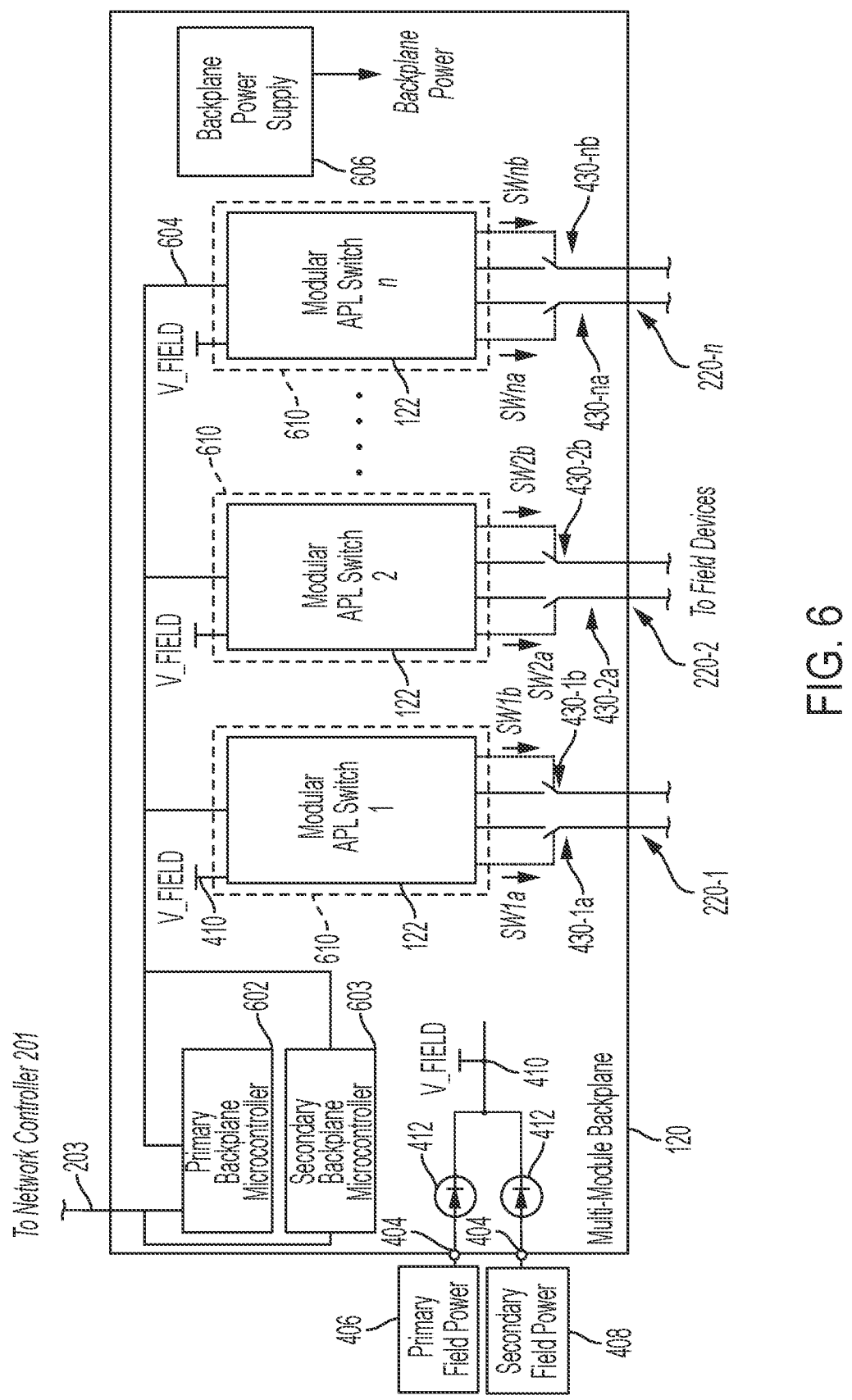
FIG. 6 is a block diagram illustrating an example backplane and associated components that can be used in the system of FIG. 1, in accordance with some aspects of this disclosure.

Referring to FIG. 6, a block diagram illustrating backplane 120 as associated with different components of the system 100 in more detail is shown. The backplane 120 includes a primary backplane microcontroller 602, a secondary backplane microcontroller 603, a communication bus 604, a backplane power supply 606, and a plurality of module bays 610. Each of the module bays 610 is configured to receive a field device characterization module, such as the modular APL switch 122. The communication bus 604 provides a communicative link between the backplane microcontrollers 602, 603 and the devices within the module bays 610 (e.g., the APL routing devices 122). The backplane microcontroller 602 (or 603) is an intermediary device (e.g., an example of the intermediary devices 204 of FIG. 2) provided between the APL routing devices 122 and the safety controller 112 and other controllers (e.g., controllers 106, 108, and 110). The primary backplane microcontroller 602 may perform routing functions, similar to network switch 304, to route communications from upstream devices (e.g., the safety controller 112 or other controllers) to the APL routing devices 122 and/or field devices 116, and to route communications from the APL routing devices 122 and/or field devices 116 to upstream devices. The primary backplane microcontroller 602 may also be configured to identify a field device characterization module upon insertion into a module bay of the module bays 610, confirm compatibility of the inserted module with the backplane 120, and then control the backplane power supply 606 to provide power to the inserted module. The secondary backplane microcontroller 603 may be a backup of the primary backplane microcontroller 602. For example, the secondary backplane microcontroller 603 may be configured similarly to the primary backplane microcontroller 602, and may perform the same functionality, and may be selectively enabled to substitute for the primary backplane microcontroller 602 in the event of a fault or error in the primary backplane microcontroller 602. Although the module bays 610 are illustrated as each having received a modular APL switch 122, in some examples, one or more of the module bays 610 are empty and/or as having received another (non-APL) field characterization module, such as a module that is coupled via a traditional analog connection to a field device.

Each module bay 610 include a physical and electrical interface to receive and couple to an associated field device characterization module, such as the APL routing devices 122. For example, with respect to the electrical interface, each module bay 610 may include terminals for connecting the communication bus 604 to the upstream communication interface of the modular APL switch 122 (see, e.g., the upstream communication interface 210 illustrated in FIG. 2); terminals for connecting the modular APL switch 122 to the backplane power supply 606 to receive power (e.g., for powering a router electronic controller 212 of the modular APL switch 122); terminals for connecting the modular APL switch 122 to the power supply node 410; and terminals for connecting the modular APL switch 122 to the power switches 430 and two-wire links 220. With respect to the physical interface, each module bay 610 may include retention elements, such as physical slots, threaded bosses to receive screws, friction fit terminal walls, and the like to selectively retain a module (e.g., the modular APL switch 122) within the module bay 610, but to also permit selective removal of the module (e.g., for replacement).

The backplane 120 further includes a similar two-wire interface power supply as described above with respect to FIG. 4. In particular, the backplane includes connections 404 for coupling to a primary field power 406 and a secondary field power 408. The secondary field power 408 may be a redundant power source providing a backup supply of power in the event of an interruption to the primary field power 406. Both the primary and secondary field powers 406, 408 may provide a DC supply of power to the APL routing devices 122 via the connections 404 for purposes of powering and communicating with the field devices 116. Each connection 404 is coupled to a power supply node 410 via a respective diode 412. Each diode 412 prevents a reverse flow of power (e.g., from the primary field power 406 to the secondary field power 408, and vice versa). Each modular APL switch 122 is coupled to the power supply node 410, which is further coupled to an upstream side of the power switches 430, in a similar manner as shown and described with respect to FIG. 4.

In FIG. 6, the power switches 430 (including power switches 430-1a through 430-nb) are integrated into the backplane 120, external to the APL routing devices 122. For example, the backplane 120 physically supports the power switches 430 and provides electrical connections between the module bays 610 and the power switches 430 to convey the switch control signals 320. Accordingly, each modular APL switch 122 outputs the respective switch control signals SW1a, SW1b, SW2a, SW2b, through SWna and SWnb, also referred to as the switch control signals 320 (see FIGS. 3 and 4), which are received by respective power switches 430. Although the power switches 430 are illustrated in FIG. 6 as part of the backplane 120 and external to the APL routing devices 122, in other examples, the power switches 430 are incorporated into the APL routing devices 122, similar to the power switches 430 illustrated in FIG. 4.

Figure 7:
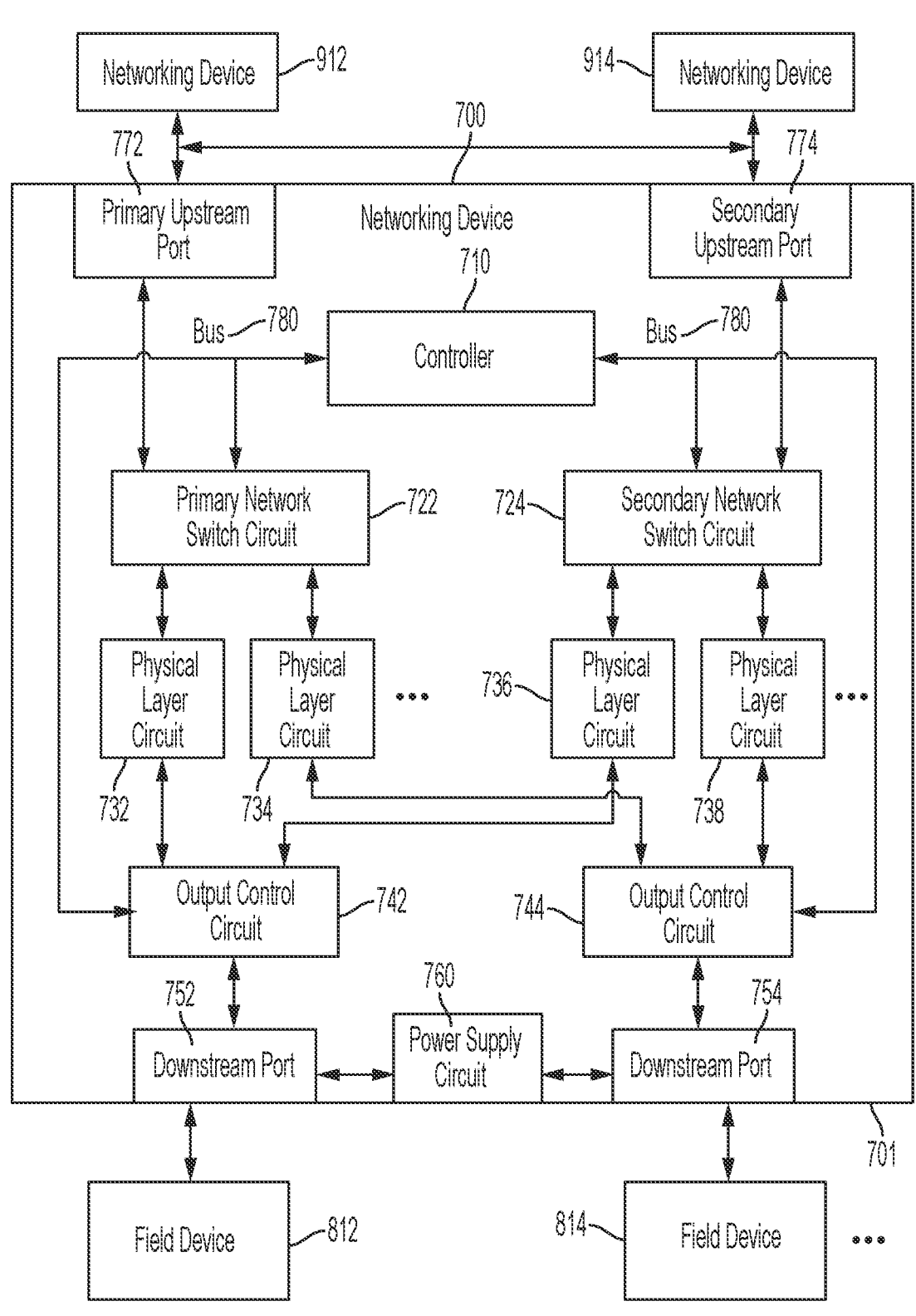
FIG. 7 is block diagram illustrating example components of a networking device that can be used in the system of FIG. 1, in accordance with some aspects of this disclosure.

Referring to FIG. 7, a block diagram illustrating example components of a networking device 700 is shown. The networking device 700 can be used in system 100, and can include similar components and perform similar functionality as the APL routing devices 102 described above. The networking device 700 is shown to be communicatively coupled to downstream field devices 812 and 814, as well as upstream networking devices 912 and 914. The field devices 812 and 814 can be analogous to the field devices 116 described above, for example, including similar components and functionality. Similarly, the connections between (and interfaces of) the networking device 700 and the field devices 812 and 814 may be similar to the connections and interfaces of the APL routing devices 102 and field devices 116, respectively, described above. For examples, the networking device 700 and field devices 812 and 814 may be connected by respective two-wire links similar to the two-wire links 220 described above. The networking devices 912 and 914 can be analogous to components of system 100 such as the controllers 106, 108 and 110, for example, including similar components and functionality. Similarly, the connections between (and interfaces of) the networking device 700 and the networking devices 912 and 914 may be similar to the connections and interfaces of the APL routing devices 102 and controllers 106, 108, and 110, respectively. For example, the networking device 700 and networking devices 912 and 914 may be connected by a bus similar to bus 114.

Depending on the application, the networking device 700 can interface with a variable number of field devices in the system 100 (e.g., 16 field devices, 24 field devices, etc.). As discussed in more detail below, the internal circuitry of the networking device 700 can provide improved reliability in terms of removing single points of failure. The networking device 700 can generally include circuitry that is configured to receive, manage, and route data from field devices upstream within system 100. The networking device 700, in some examples, can be provided as an APL switch that can be used with Ethernet-APL field devices in industrial applications. The networking device 700 can operate as a high availability switch within system 100 due to its redundant internal circuitry, including the primary and secondary data paths as discussed below. The networking device 700 may include a housing 701 supporting and housing the circuitry of the networking device 700 described herein, including the redundant circuitry. It will be appreciated that the networking device 700 can be provided with a variety of different types and quantities of ports for communicating within the system 100.

The networking device 700 is shown to include a controller 710 within the housing 701. The controller 710 can be similar to the microcontroller 300 described above. The controller 710 can include an electronic processor and a memory storing instructions retrieved and executed by the electronic processor to perform various functions. The memory can include read-only memory (ROM), random access memory (RAM), other non-transitory computer-readable media, or a combination thereof. The electronic processor can include one or more processors, field programmable gate arrays (FPGAs), application specific integrated circuits (ASICs), or other processing circuitry operating alone or in combination with one another. The controller 710 can interface with different components of networking device 700, such as described below, via a communication bus 780. The controller 710 can also interface with the field devices 812 and 814, as well as the upstream networking devices 912 and 914. The controller 710 can configure different components of networking device 700, such as primary network switch circuit 722 and secondary network switch circuit 724. The controller 710 can also receive various data, including by monitoring and reading status registers of components including physical layer circuits 732, 734, 736, and 738 and the primary and secondary network switch circuits 722 and 724.

The networking device 700 is also shown to include a primary network switch circuit 722 and a secondary network switch circuit 724. In some examples, the primary network switch circuit 722 and the secondary network switch circuit 724 can be implemented as Ethernet switches provided within networking device 700. The primary network switch circuit 722 and the secondary network switch circuit 724 can perform similar functions and include similar components as the network switch 304 described above, for example. The primary network switch circuit 722 and the secondary network switch circuit 724 can each include a collection of ports for receiving and routing data from the field devices 812 and 814 to the networking devices 912 and 914. The primary network switch circuit 722 and the secondary network switch circuit 724 can parse communications from the field devices 812 and 814, which can include a series of data packets including a header and payload data packets, to identify intended recipients from an address or identifier (e.g., MAC address) in the header. The primary network switch circuit 722 and the secondary network switch circuit 724 can then route the communications to the intended recipients.

The primary network switch circuit 722 can be connected in a primary data path of networking device 700 and the secondary network switch circuit 724 can be connected in a secondary data path of networking device 700. Responsive to detecting a failure (fault) associated with any of the individual hardware components in the primary data path, the secondary network switch circuit 724 and associated secondary data path provides a standby internal component that can be used without affecting operation of networking device 700. As a result, failure of individual hardware components may not require moving field devices between different port of networking device 700 and/or replacing networking device 700 entirely, and may not cause a time period of inoperability of the networking device 700 that may otherwise occur. The primary network switch circuit 722 and the secondary network switch circuit 724 can be connected to the primary upstream port 772 and the secondary upstream port 774, as discussed in more detail below.

The networking device 700 is also shown to include physical layer circuits 732, 734, 736, and 738. The physical layer circuits 732, 734, 736, and 738 ("PHYs") can be implemented as integrated circuits, for example, that are used to provide APL functionality. The physical layer circuits 732, 734, 736, and 738 can perform similar functions and include similar components as the APL physical interface 310 described above, for example. The physical layer circuits 732, 734, 736, and 738 can translate communication based on two-wire (APL) protocol to Ethernet protocol and provide communication to the primary network switch circuit 722 and the secondary network switch circuit 724 via Ethernet in some examples. However, the physical layer circuits 732, 734, 736, and 738 can translate between other protocols and provide different functionality depending on the application. In some examples, some or all ports of the primary network switch circuit 722 and the secondary network switch circuit 724 include integrated PHYs, thereby removing the need for one or more of the physical layer circuits 732, 734, 736, and 738.

As shown in FIG. 7, the physical layer circuits 732 and 734 are both connected to the primary network switch circuit 722. However, the physical layer circuit 732 is connected to the field device 812 (through the downstream port 752 and the output control circuit 742), whereas the physical layer circuit 734 is connected to the field device 814 (through the downstream port 754 and the output control circuit 744). In similar fashion, the physical layer circuits 736 and 738 are both connected to the secondary network switch circuit 724. However, the physical layer circuit 736 is connected to the field device 812 (through the downstream port 752 and the output control circuit 742), whereas the physical layer circuit 738 is connected to the field device 814 (through the downstream port 754 and the output control circuit 744). As shown using the ellipses in FIG. 7, it will be appreciated that physical layer circuits like the physical layer circuits 732, 734, 736, and 738 can be added to the networking device 700 based on the number of ports connectable to field devices that networking device 700 is provided with. For example, if the networking device 700 includes 16 downstream ports analogous to the downstream ports 752 and 754, then the networking device 700 can include 32 physical layer circuits analogous to the physical layer circuits 732, 734, 736, and 738 (16 physical layer circuits connected to the primary network switch 722 and 16 physical layer circuits connected to the secondary network switch circuit 724). Also, in some examples, the network switch circuit 722 and/or the network switch circuit 724 can include one or more ports that have built in PHYs, and thus for connections using those ports a corresponding physical layer circuit may not be necessary.

The networking device 700 is also shown to include an output control circuit 742 and an output control circuit 744. The output control circuit 742 is shown to be connected to the downstream port 752, and the output control circuit 744 is shown to be connected to the downstream port 754. Also shown, the output control circuit 742 and the output control circuit 744 are connected to the controller 710 via the bus 780. The controller 710 can provide control signals to the output control circuit 742 and the output control circuit 744 to operate the output control circuit 742 and the output control circuit 744. The output control circuit 742 and the output control circuit 744 can generally be used to control data flow within networking device 700, to switch between the primary data path (associated with the primary network switch circuit 722) and the secondary data path (associated with the secondary network switch circuit 724). For example, if controller 710 determines that a failure has occurred with one or more of the hardware components in the primary data path (e.g., the downstream port 752, the physical layer circuits 732 and 734, etc.), the controller 710 can send control signals to the output control circuit 742 and the output control circuit 744 to switch to the secondary data path.

The output control circuit 742 and the output control circuit 744 can include various electronic components, such as multiplexers, transistors, analog switches, or the like to implement this functionality. As shown, the output control circuit 742 can operate to route data received from the field device 812 either to the physical layer circuit 732 (primary data path) or to the physical layer circuit 736 (secondary data path). Likewise, the output control circuit 744 can operate to route data received from the field device 814 either to the physical layer circuit 734 (primary data path) or to the physical layer circuit 738 (secondary data path). The output control circuit 742 and the output control circuit 744 can be provided as separate, individual circuits or in some examples can be combined into a single circuit.

The networking device 700 is also shown to include a downstream communication port 752 and a downstream communication port 754. The downstream port 752 and the downstream port 754 can perform similar functions and include similar components as the APL interface 214 as discussed above, for example. The downstream port 752 and the downstream port 754 can include terminals for connecting the field device 812 and the field device 814, respectively, to the networking device 700 via links like two-wire links 220 described above. In some examples, the downstream port 752 and the downstream port 754 are APL ports, however the downstream port 752 and the downstream port 754 can be implemented using different types of ports (e.g., Ethernet ports or small form-factor pluggable (SFP) ports) depending on the application. As noted above, additional downstream ports can be provided on networking device 700 analogous to the downstream port 752 and the downstream port 754 to support a variable number of field devices (e.g., 16 field devices, 24 field devices, 32 field devices, etc.). The downstream port 752, as shown, is connected to the field device 812 and to the output control circuit 742. The downstream port 754, as shown, is connected to the field device 814 and to the output control circuit 744. The downstream port 752 and the downstream port 754 (and/or the power supply circuit 760 described below) can include power supply circuitry, including inductors, capacitors (e.g., inductors 424 and 426, capacitors 420, etc.), and other electronic components for storing and transferring power to the field device 812 and the field device 814.

The networking device 700 is also shown to include a power supply circuit 760 that can provide power to the field device 812 and the field device 814 (e.g., via two-wire links 220), as well as to various components of networking device 700. The power supply circuit 760 can perform similar functions and include similar components as the power supply 403 described above. For example, the power supply circuit 760 can include both the primary field power source 406 and the secondary field power source 408, as well as respective diodes 412. Power supply circuit 760 (and/or the downstream ports 752 and 754) can also include power supply circuitry, including inductors, capacitors (e.g., inductors 424 and 426, capacitors 420, etc.), and other electronic components for storing and transferring power to the field device 812 and the field device 814.

The networking device 700 is also shown to include both a primary upstream communication port 772 and a secondary upstream communication port 774. The primary upstream port 772, as shown, is connected to the primary network switch circuit 722. The secondary upstream port 774, as shown, in connected to the secondary network switch circuit 724. The primary upstream port 772 and the secondary upstream port 774 can be used to connect the networking device 700 to the networking device 912 and the networking device 914, respectively. The primary upstream port 772 and the secondary upstream port 774, in some examples, can also be used to connect to a single upstream networking device. In some examples, the primary upstream port 772 and the secondary upstream port 774 are implemented as Ethernet ports, however the primary upstream port 772 and the secondary upstream port 774 can also be implemented as APL ports, among other types of ports. The primary upstream port 772 and the secondary upstream port 774 can be configured for communication speeds of 100 megabytes, 1 gigabyte, or other speeds depending on the application.

In some examples, the networking device 700 is implemented as or serves as a modular APL switch 122, such as described above with respect to FIG. 6. Accordingly, the backplane 120 receives one or more of the networking devices 700 (as a modular APL switch 122) into respective bays of the module bays 610. In such examples, the networking device 700 may operate as a modular APL switch 122 as described above, but with the additional functionality of the networking device 700 including providing a primary and secondary path (e.g., as described herein and with respect to the process of FIG. 8). In some examples, the controller 710 may also send a control signal to deselect or deactivate the primary backplane microcontroller 602 and to select or activate the secondary backplane microcontroller 603 in response to a detecting a failure of the primary backplane microcontroller 602 or communications thereof, or in conjunction with selecting the secondary connection (including, e.g., the secondary networking switch 724, as described in further detail with respect to the process of FIG. 8) in response to detecting a failure in the first connection (including, e.g., the primary networking switch 722).

In some examples, the components of networking device 700 illustrated in FIG. 7 can be rearranged and/or different/additional components can be provided to achieve similar results. For example, networking device 700 can be provided as multiple separate devices connected on a high availability carrier such as backplane 120. In such an example, two redundant I/O Ethernet ports (IOPs) and some number of removable cards (CHARM-like APL cards) can be connected to the carrier, and each of the removable cards can connect to an APL field device and be field-replaceable. In such an example, controller 710 can be implemented using two separate controllers integrated as part of the two redundant IOPs, where the IOPs can also include the primary and secondary network switch circuits 722 and 724, as well as the primary and secondary upstream ports 772 and 774, respectively. In such an example, carrier power such as from backplane 120 can be used to power the removable cards, which can contain an APL switch and/or PHY for each port.

For example, with reference back to FIG. 6, the functionality of the networking device 700 may be divided among the backplane microcontrollers 602 and 603 (e.g., serving as I/O Ethernet ports) and the modular APL switches 122 received in the backplane 120. For example, the primary network switch circuit 722 and upstream port 772 may be incorporated into the primary backplane microcontroller 602; the secondary network switch circuit 724 and upstream port 774 may be incorporated into the secondary backplane microcontroller 603; and the physical layer circuits 732, 736, output control circuit 742, and downstream port 752 may be incorporated into one of the APL routing devices 122 (as a CHARM-like APL cards). The controller 710 that controls the output control circuit 742 may reside in the modular APL switch 122, and/or the control functionality of the controller 710 to control the output control circuit 742, as described herein, may be incorporated into one of the backplane microcontrollers 602 or 603.

Also, it will be appreciated that wireless components can replace one or more of the wired components described, such as using a wireless transmitter in place of the primary upstream port 772 and/or the secondary upstream port 774, for example. Also, it will be appreciated that the term "connected" generally refers to circuit components that are communicatively coupled, either directly or indirectly.

Figure 8:
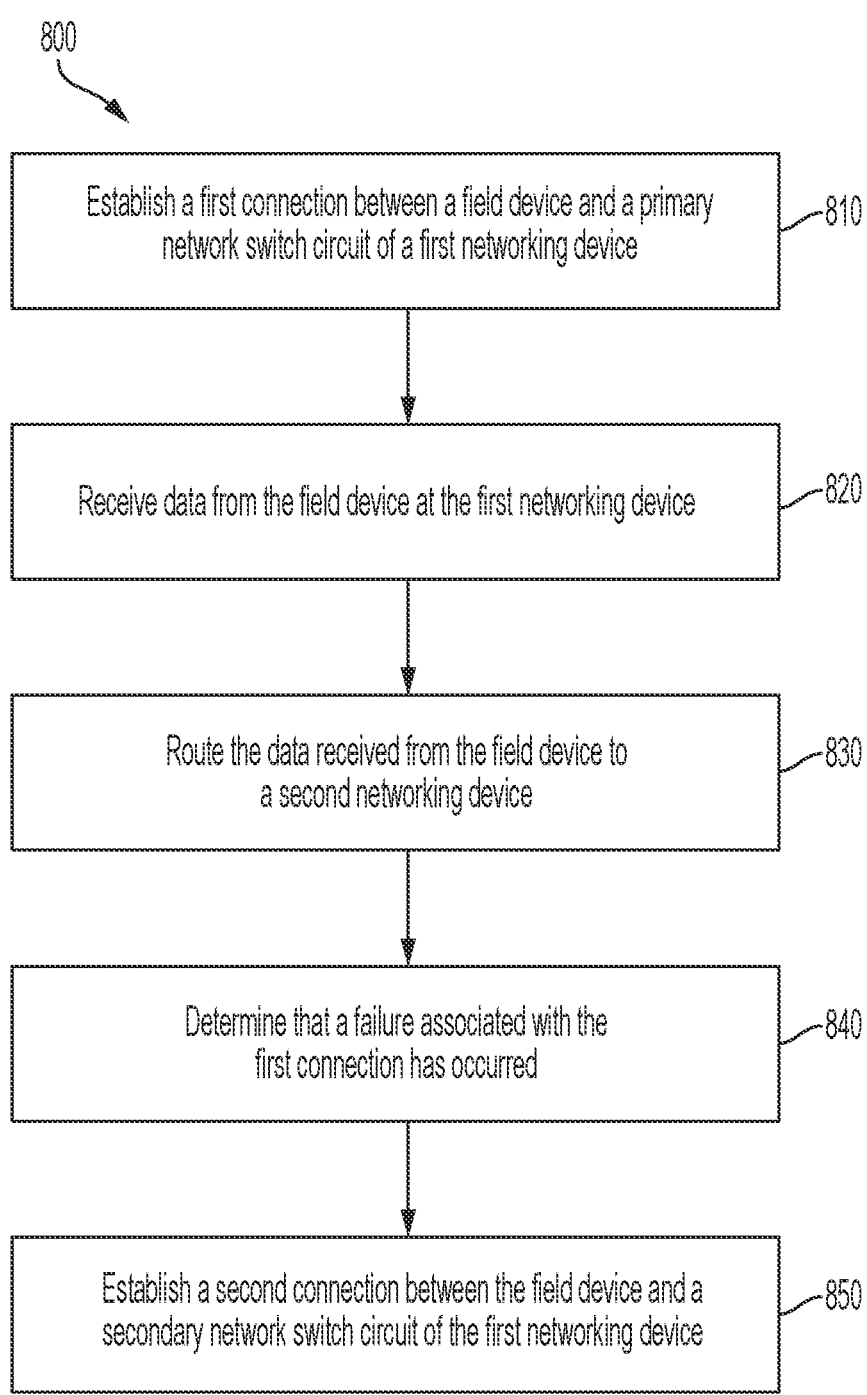
FIG. 8 is a flowchart illustrating a networking process that can be implemented by the networking device of FIG. 7, in accordance with some aspects of this disclosure.

Referring to FIG. 8, a flowchart illustrating a networking process 800 that can be performed by networking device 700 is shown. Process 800 can be performed by networking device 700 to provide improved reliability by using the redundant internal circuitry of networking device 700. Process 800 can remove one or more single points of failure from ceasing or interrupting operation of networking device 700 by using the redundant circuitry of networking device 700 in response to any detected failures. Process 800 can also include sending a notification in response to detecting that a failure has occurred indicating the networking device 700 is running in a degraded mode. The high availability provided by networking device 700 based on executing process 800 can help avoid problems with control, monitoring, and safety of critical industrial processes.

At block 810, the process 800 includes establishing a first connection between a field device and a primary network switch circuit of a first networking device. For example, the networking device 700 may establish the first connection between the field device 812 and the primary network switch circuit 722. First, the field device 812 can be connected to the networking device 700 via the downstream port 752. The field device 812 can be connected to the networking device 700 by connecting the field device 812 to the downstream port 752 using an APL connection, for example via two-wire links 220. For example, the networking device 700 may receive one of the two-wire links 220 at the downstream port 752 to be connected to the field device 812 Then, the internal circuitry of networking device 700 can form a connection between the field device 812 and the primary network switch circuit 722. For example, data from field device 812 can be received at the downstream port 752, provided to the output control circuit 742, optionally provided to the physical layer circuit 732, and then provided to the primary network switch circuit 722. Additionally or alternatively, data from the primary network switch circuit 722 may be provided to the physical layer circuit 732, provided to the output control circuit 742, and then provided by the downstream port 752 to the field device 812. Additionally or alternatively, particularly in the case of a field device 812 using an APL connection and connected via one of the two-wire links 220, the networking device 700 may also provide power to the field device 812 (e.g., as described above with respect to the field device 116 and FIGS. 4 and 5).

At block 820, the process 800 includes receiving data from the field device at the first networking device. For example, the networking device 700 may receive data from the field device 812 at the downstream port 752 of the networking device 700. The data can include parameters associated with an industrial process, such as sensor data including temperature data, pressure data, humidity data, or the like. The data can also include status data such as open/closed status, on/off status, or the like, as well as identifying data including device identifiers and associated metadata, as well as various other types of data such as described herein with respect to the field devices 116. The data received from the field device can be provided to the output control circuit 742, optionally provided to the physical layer circuit 732, and then provided to the primary network switch circuit 722. The data can be received as a series of data packets including a header and payload data packets, for example, as discussed above.

At block 830, the process 800 includes routing the data received from the field device to a second networking device. For example, the data received from the field device 812 can be routed by the primary network switch circuit 722 to the networking device 912. The primary network switch circuit 722 can parse the data received from the field device 812 and determine that the data should be routed to the networking device 912, for example. The primary network switch circuit 722 can parse the received data packets and determine that the networking device 912 is the intended recipient based on an identifier such as an address (e.g., MAC address) in the header of the received data packets. The primary network switch circuit 722 can then send the payload data packets to the primary upstream port 772 for example, for forwarding to the networking device 912. The networking device 912 can receive the payload data packets from networking device 700 via a wired connection (e.g., a CAT-6 Ethernet cable, etc.) to the primary upstream port 772, for example, among other possible types of connections.

At block 840, the process 800 includes determining that a failure associated with the first connection has occurred. For example, controller 710 can monitor and receive various data associated with different components of networking device 700, and determine that a failure associated with the connection between the field device 812 and the primary network switch circuit 722 has occurred. Controller 710 can read status registers of components including physical layer circuits 732 and 734, the downstream port 752, and the primary and secondary network switch circuits 722 and 724, for example, and parse the data to proactively identify problems. These components of networking device 700 can save error messages and other status alerts in their respective status registers to provide an indication of any problems. For example, if a hardware failure in physical layer circuit 732 occurs (as indicated by a status register thereof), communication between field device 812 and the primary network switch circuit 722 can be cut off along this primary communication path. Also, if a hardware failure associated with a port of the primary network switch circuit 722 occurs (e.g., a port with a built in PHY), communication between field device 812 and the primary network switch circuit 722 can likewise be cut off along this primary communication path.

At block 850, the process 800 includes establishing a second connection between the field device and a secondary network switch circuit of the first networking device. For example, after determining that the failure has occurred with the first connection, the controller 710 can send a control signal to the output control circuit 742 that causes the output control circuit 742 to route data to and/or from the field device 812 to the physical layer circuit 736 (and/or the secondary network switch 724) instead of to and/or from the physical layer circuit 732 (and/or the primary network switch 722). In this manner, the internal circuitry of networking device 700 can use the secondary data path to continue normal operation. That is, further communications that the networking device 700 receives for the field device 812 (e.g., from the networking device 912) may be routed by the networking device 700 via the secondary data path (e.g., secondary upstream port 774, secondary network switch circuit 724, and (optionally) physical layer circuit 736) to the field device 812, and further communications that the networking device 700 receives from the field device 812 may be routed by the networking device 700 via the secondary data path to an upstream device, such as the networking device 912.

Also, in some examples, after determining that the failure associated with the first connection has occurred, the networking device 700 can be configured to transmit a signal (e.g., to networking device 912) indicating that networking device 700 is running in a degraded mode. This signal can, in some examples, then be used to provide an alert to one or more of the controllers 106 108, 110, 112, the application stations 132, the maintenance stations 134, the engineering stations 136, and/or the operator stations 138. This functionality allows the networking device 700 to not only continue operating (e.g., using the internal redundant circuitry) without interruption or unscheduled downtime for maintenance, but also to alert personnel associated with system 100 (e.g., users of networking device 700) of the failure so that appropriate action can be taken.

It will be appreciated that various adaptations to process 800 as described are contemplated within the scope of this disclosure, depending on the intended application. In some examples, in block 820, the networking device 700 receives data for routing to the field device 812 (via primary port 772), rather than (or in addition to) receiving data from the field device 812. More specifically, in such examples of the block 820, the data can include control parameters associated with an industrial process, for example, commands for controlling the field device 812 (e.g., a valve or other output controlling component), and/or the data can include a request for information from the field device 812 (e.g., sensor data, status data, etc.). The data can be received by the networking device 700 as a series of data packets including a header and payload data packets, for example, as discussed above. Then, in block 830, the networking device 700 routes this received data to the field device 812 along the primary data path (primary network switch circuit 722, (optionally) physical layer circuit 732, and output control circuit 742). The networking device 700 may route the data to the field device 812, for example, using similar principles as described above with respect to the router electronic controller 212 of FIGS. 2 and 3. For example, the data received from the networking device 912 can be routed by the primary network switch circuit 722 to the field device 812. The primary network switch circuit 722 can parse the data received from the networking device 912 and determine that the data should be routed to the field device 812, for example. The primary network switch circuit 722 can parse the received data packets and determine that the field device 812 is the intended recipient based on an identifier such as an address (e.g., MAC address) in the header of the received data packets. The primary network switch circuit 722 can then send the payload data packets to the downstream port 752, for example, for forwarding to the field device 812. In such examples of the process 800, the other blocks 810, 840, and 850 may be executed in a similar manner as previously described.

Figure 9:
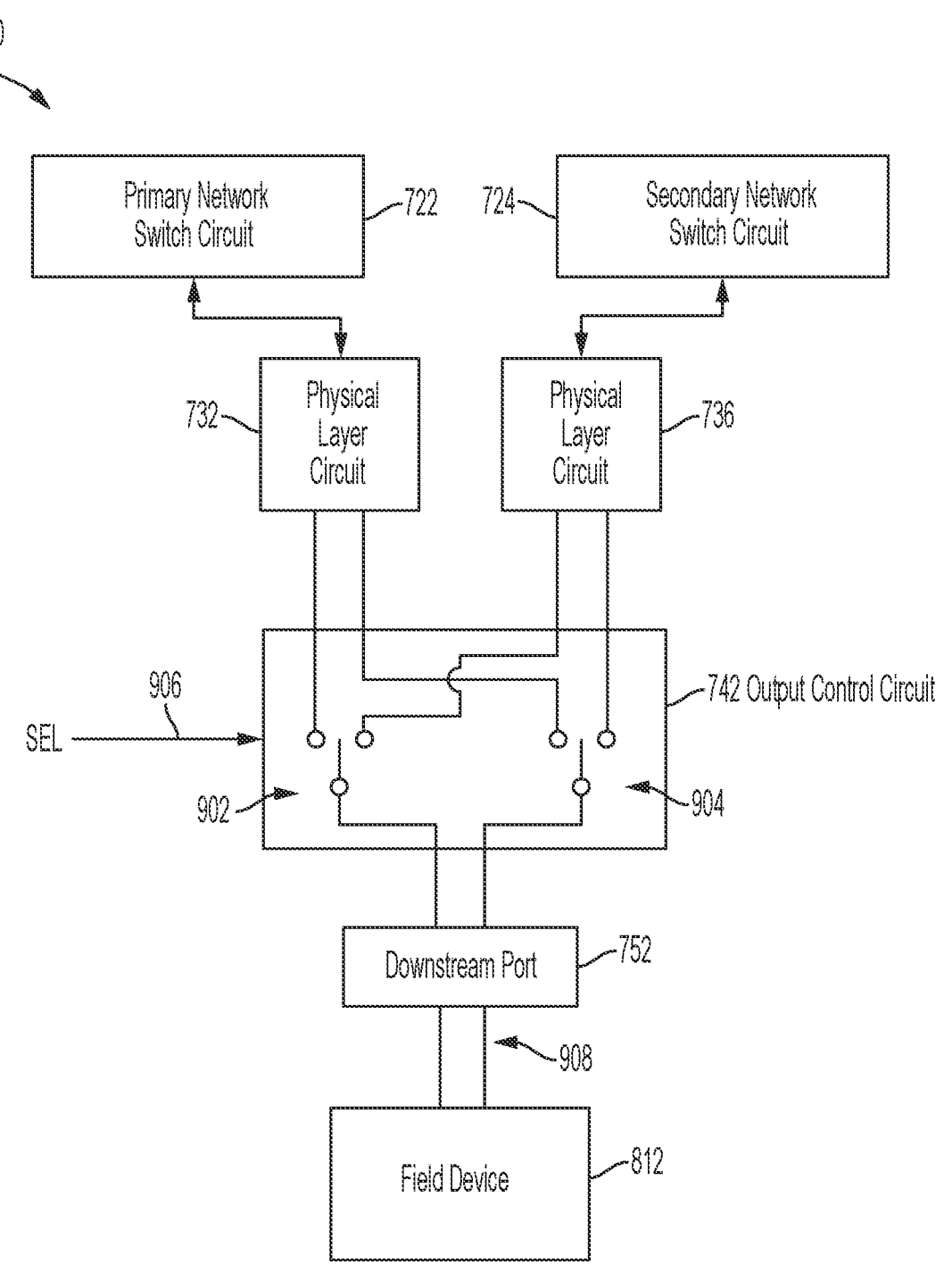
FIG. 9 is a diagram of a portion of the networking device of FIG. 7, in accordance with some aspects of this disclosure.

FIG. 9 illustrates a portion 900 of an example of the network device 700. In particular, in FIG. 9, an example of the primary and secondary connections (or communication paths) from network switch to field device are illustrated with respect to the field device 812, with other elements of the networking device 700 not illustrated (refer, e.g., to FIG. 7). Additionally, in the example illustrates, the field device 812 and networking device 700 communicates using a two-wire communication and power protocol, such as APL, and are connected by a two-wire link 908, which is similar to one of the two-wire links 220 described above (see, e.g., FIGS. 4-5). In FIG. 9, an example of the output control circuit 742 is illustrated in additional detail. The output control circuit 742 includes a first switch or selector 902 and a second switch or selector 904, one for each wire of the two-wire link 908. The output control circuit 742 receives a selection control signal 906 ("SEL"). With reference to FIG. 7, the selection control signal 906 may be provided to the output control circuit 742 over bus 780 from the controller 710. Depending on the value of the selection control signal 906, the switches or selectors 902 and 904 connect the downstream port 752 (and, thus, the two-wire link 908 and field device 812) to either (i) the primary network switch circuit 722 and physical layer circuit 732, or (ii) the secondary network switch circuit 724 and the physical layer circuit 736. The output control circuit 742 may also be referred to as a multiplexor/demultiplexer. In other examples, the output control circuit 742 may include a different circuit arrangement to perform similar selection functionality.

The disclosure is not limited in its application to the details of construction and the arrangement of components set forth in this description or illustrated in the accompanying drawings. The disclosure is capable of other embodiments and of being practiced or of being carried out in various ways. Also, it is to be understood that the phraseology and terminology used herein is for the purpose of description and should not be regarded as limiting. The use of "including," "comprising," "containing," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

The term "article of manufacture" as used herein is intended to encompass a computer program accessible from any computer-readable device, carrier (e.g., non-transitory signals), or media (e.g., non-transitory media). For example, non-transitory computer-readable media can include but are not limited to magnetic storage devices (e.g., hard disk, floppy disk, magnetic strips, and so on), optical disks (e.g., compact disk ("CD"), digital versatile disk ("DVD'"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover or include the items individually and the items together. For example, a device having "a and/or b" is intended to cover or include: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The provided detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

While the invention herein disclosed has been described in terms of specific embodiments and applications thereof, numerous modifications and variations could be made thereto by those skilled in the art without departing from the scope of the invention set forth in the claims.

The invention claimed is:

1. A networking device, comprising:
a primary network switch circuit;
a secondary network switch circuit;

a first physical layer circuit connected to the primary network switch circuit;

a second physical layer circuit connected to the secondary network switch circuit;

a first communication port connectable to a first field device;

a second communication port connectable to a second field device;

a first output control circuit connected to the first communication port, the first physical layer circuit, and the second physical layer circuit, the first output control circuit configured to selectively connect the first communication port to either the first physical layer circuit or the second physical layer circuit;

a second output control circuit connected to the second communication port; and a controller connected to the primary network switch circuit, the secondary network switch circuit, the first output control circuit, and the second output control circuit, the controller comprising circuitry configured to:

determine that a failure associated with the first physical layer circuit has occurred; and responsive to determining that the failure has occurred, operate the first output control circuit to route data between the first field device and the second physical layer circuit instead of the first physical layer circuit without disconnecting the first field device from the first communication port.

2. The networking device of claim 1, further comprising a third physical layer circuit connected to the second output control circuit and to the primary network switch circuit, and a fourth physical layer circuit connected to the second output control circuit and to the secondary network switch circuit.

3. The networking device of claim 2, wherein the circuitry of the controller is configured to:

determine that a second failure associated with the third physical layer circuit has occurred; and responsive to determining that the second failure has occurred, operate the second first output control circuit to route data between the second field device and the fourth physical layer circuit instead of the third physical layer circuit without disconnecting the second field device from the second communication port.

4. The networking device of claim 1, further comprising a communication bus that connects the controller, the primary network switch circuit, the secondary network switch circuit, the first output control circuit, and the second output control circuit, wherein the first communication port and the second communication port are advanced physical layer ports.

5. The networking device of claim 1, wherein the circuitry of the controller is further configured to route data received from the first field device to an edge gateway device in communication with one or more remote servers, and to route data received from the edge gateway device to the first field device.

6. The networking device of claim 1, further comprising a power supply circuit, the power supply circuit comprising a primary power source and a secondary power source, the power supply circuit coupled to the first communication port and the second communication port and configured to provide power to the first field device via the first communication port and to the second field device via the second communication port.

7. The networking device of claim 6, the power supply circuit further comprising a first diode connected to the primary power source and a second diode connected to the secondary power source.

8. The networking device of claim 1, wherein the secondary network switch circuit is configured to route data received from the first field device to a second networking device.

9. The networking device of claim 8, further comprising a third communication port connectable to the second networking device, wherein the secondary network switch circuit is configured to route the data received from the first field device to the second networking device via the third communication port.

10. The networking device of claim 9, wherein the secondary network switch circuit is configured to send a signal to the second networking device via the third communication port, the signal indicating that the networking device is operating in a degraded mode responsive to determining that the failure has occurred.

11. The networking device of claim 1, wherein the circuitry of the controller is configured to determine that the failure has occurred by reading a status register of the primary network switch circuit.

12. A method, comprising:
establishing, via a communication port of a first networking device, a first connection between a field device and a first physical layer circuit that is connected to a primary network switch circuit of the first networking device;
receiving, via the communication port of the first networking device, first data from the field device;
routing, by the first networking device via the primary network switch circuit, the first data received from the field device to a second networking device;
determining, by a processor of the first networking device, that a failure associated with the first connection between the field device and the first physical layer circuit of the first networking device has occurred;
establishing, via the communication port of the first networking device, a second connection between the field device and a second physical layer circuit that is connected to a secondary network switch circuit of the first networking device responsive to determining that the failure has occurred;
receiving, via the communication port of the first networking device, second data from the field device; and
routing, by the first networking device via the secondary network switch circuit, the second data received from the field device to the second networking device.

13. The method of claim 12, wherein determining, by the processor of the first networking device, that the failure associated with the first connection has occurred comprises reading a status register of the primary network switch circuit.

14. The method of claim 12, further comprising, responsive to determining that the failure associated with the first connection has occurred, sending a signal to the second networking device via the secondary network switch circuit, the signal indicating that the first networking device is operating in a degraded mode.

15. A networking device, comprising:
a primary network switch circuit;
a secondary network switch circuit;
a first physical layer circuit connected to the primary network switch circuit;
a second physical layer circuit connected to the secondary network switch circuit;
a communication port connectable to a field device;
an output control circuit connected to the communication port, the first physical layer circuit, and the second physical layer circuit, the output control circuit configured to selectively connect the communication port to either the first physical layer circuit or the second physical layer circuit; and
a controller connected to the primary network switch circuit, the secondary network switch circuit, and the output control circuit, the controller comprising circuitry configured to:
determine that a failure associated with the first physical layer circuit has occurred; and
responsive to determining that the failure has occurred, operate the output control circuit to route data between the field device and the second physical layer circuit without disconnecting the field device from the communication port.

16. The networking device of claim 15, further comprising:
a second communication port connectable to a second field device;
a third physical layer circuit connected to the primary network switch circuit;
a fourth physical layer circuit connected to the secondary network switch circuit; and
a second output control circuit connected to the second communication port, the third physical layer circuit, and the fourth physical layer circuit, the second output control circuit configured to selectively connect the second communication port to either the third physical layer circuit or the fourth physical layer circuit;
wherein the circuitry of the controller is configured to:
determine that a second failure associated with the third physical layer circuit has occurred; and
responsive to determining that the second failure has occurred, operate the second output control circuit to route data between the second field device and the fourth physical layer circuit without disconnecting the second field device from the second communication port.

17. The networking device of claim 15, wherein;
the networking device is incorporated into a backplane having a plurality of module bays coupled to a power supply circuit, a primary backplane microcontroller, and a secondary backplane microcontroller; and
the networking device is receivable in one of the module bays to receive power from the power supply circuit.

18. The networking device of claim 15, wherein, responsive to determining that the failure has occurred, the secondary network switch circuit is configured to send a signal to a second networking device indicating that the networking device is operating in a degraded state.

19. The networking device of claim 18, wherein the secondary network switch circuit is configured to route data received from the second networking device to the field device.

20. The networking device of claim 15, wherein the circuitry of the controller is configured to determine that the failure has occurred by reading a status register of the primary network switch circuit.

* * * * *